H. P. HASKIN.
Gate.
No. 85,091.
Patented Dec. 22, 1868.
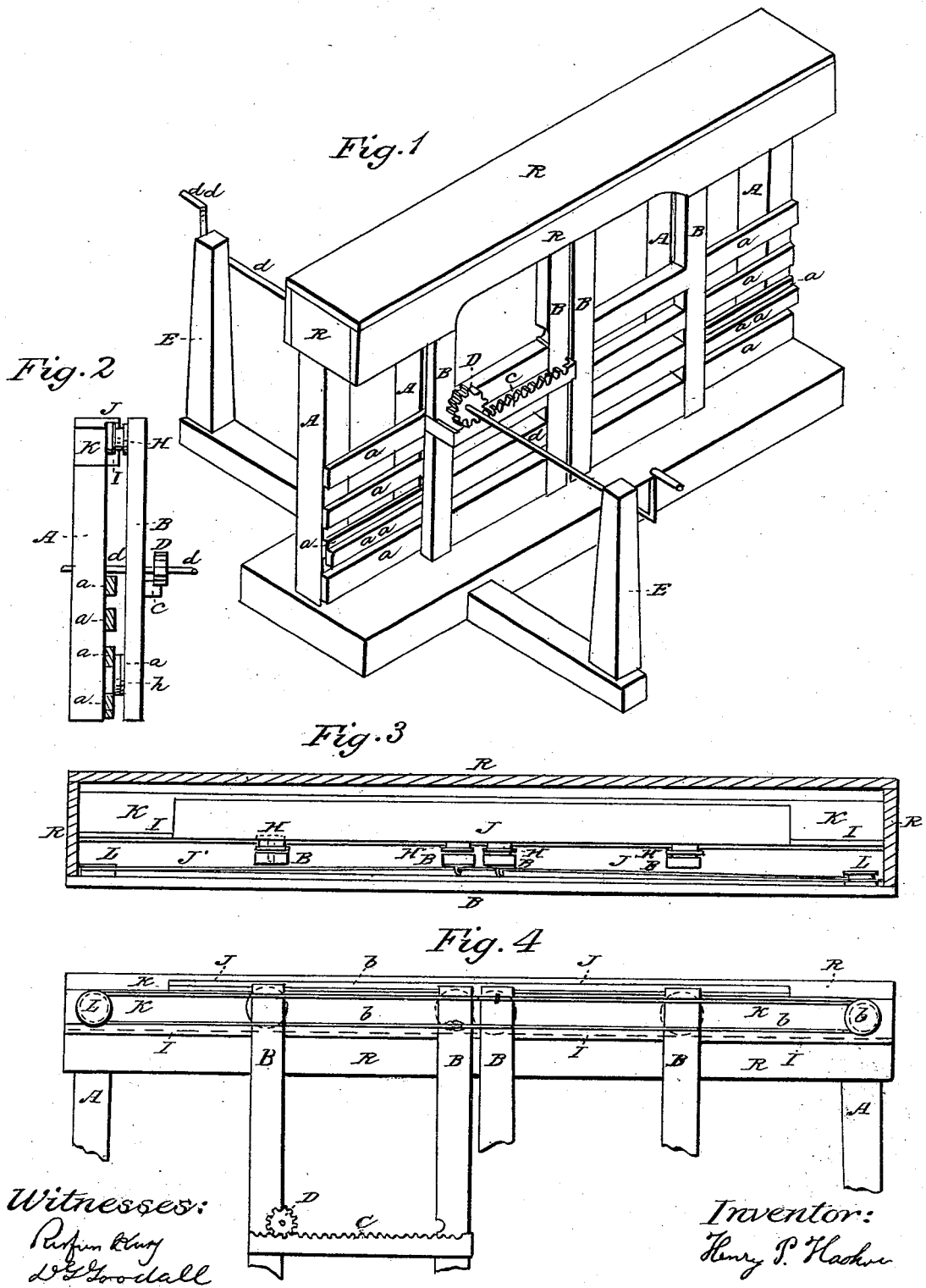

United States Patent Office.

HENRY P. HASKIN, OF ROSCOE, ILLINOIS, ASSIGNOR TO HIMSELF AND JOSEPH L. BRENTON, OF BELOIT, WISCONSIN.

Letters Patent No. 85,091, dated December 22, 1868.

IMPROVEMENT IN GATES.

The Schedule referred to in these Letters Patent and making part of the same.

*To all whom it may concern:*

Be it known that I, HENRY P. HASKIN, of Roscoe, of Winnebago county, in the State of Illinois, have invented certain new and useful Improvements in the Mode of Operating a Gate or Gates; and I hereby declare the following description and accompanying drawings are sufficient to enable any person skilled in the art or science to which it most nearly appertains, to make and use my said invention or improvements without further invention or experiment.

The nature of my invention and improvements consists in the employment of the device, hereinafter described, and shown in the accompanying drawings, for the purpose of operating a double gate.

Figure 1 is a perspective view of the gate complete;

Figure 2 is an end section thereof;

Figure 3 is a top view, with the cover, R, removed; and

Figure 4 is a vertical longitudinal section of the same.

In the drawings—

A A represent the main frame of the gate standing transversely to the roadway.

R, the top and sides of the said main frame of the gate.

K, the ends.

E E are operating-posts on either side-approach to the gate, to which is secured the shaft $d$, carrying the pinion D and cranks $d\ d$.

$a\ a$ are sections of fence rigidly fixed to the gate-frame A A.

B B are the gates.

C, the rack, actuated by the pinion D.

H H are grooved rollers, traversing the track I I.

J is a guard-piece to prevent said rollers from leaving the track.

L L are pulleys carrying the endless chain or belt $b\ b$.

$h\ h$ are rollers near the lower sides of the gates, supporting them in position, turning loosely on suitable bolts through vertical bars of the gates B.

The periphery of said rollers is grooved with traverse tongue-piece $a\ 'a$ of the inverted track, as shown.

Similar letters of reference indicate like parts.

The lower strand of the endless band or chain $J'$ is attached to the upper front corner of the left gate, and the upper strand thereof to the opposite corner of the right half of the same. Being thus arranged, the operation in opening is simple and easy, to wit:

By turning the cranks $d\ d$ from left to right, the gate is opened, and closed by reversing the operation of said cranks, but in operating the gates from inside-approach, the direction of the cranks must be exactly reversed to either open or close.

What I claim as my invention, and desire to secure by Letters Patent, is—

1. Broadly, the employment of the endless band or chain $J'J'$, in combination with the rack C and pinion D, shaft $d$ and cranks $d\ d$.

2. The inverted guide-track $a\ a$, when the whole is constructed and arranged substantially as herein set forth to operate as specified.

HENRY P. HASKIN.

Witnesses:
 RUFUS KING,
 D. G. GOODALL.